(12) United States Patent
Gao et al.

(10) Patent No.: US 12,424,703 B2
(45) Date of Patent: Sep. 23, 2025

(54) INORGANIC MATERIALS FOR COMPOSITE SEPARATOR IN ELECTROCHEMICAL CELLS

(71) Applicant: Pacific Industrial Development Corporation, Ann Arbor, MI (US)

(72) Inventors: Shuang Gao, Ann Arbor, MI (US); David Shepard, Canton, MI (US); Yunkui Li, Ann Arbor, MI (US); Anatoly Bortun, Ypsilanti, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 747 days.

(21) Appl. No.: 17/772,268

(22) PCT Filed: Oct. 30, 2020

(86) PCT No.: PCT/US2020/058094
§ 371 (c)(1),
(2) Date: Apr. 27, 2022

(87) PCT Pub. No.: WO2021/087191
PCT Pub. Date: May 6, 2021

(65) Prior Publication Data
US 2022/0376357 A1    Nov. 24, 2022

Related U.S. Application Data

(60) Provisional application No. 62/928,526, filed on Oct. 31, 2019, provisional application No. 62/928,511, filed on Oct. 31, 2019.

(51) Int. Cl.
*H01M 50/446* (2021.01)
*H01M 4/62* (2006.01)
*H01M 10/0525* (2010.01)
*H01M 10/42* (2006.01)
*H01M 50/204* (2021.01)
*H01M 50/431* (2021.01)
*H01M 50/434* (2021.01)
*H01M 50/449* (2021.01)
*H01M 50/451* (2021.01)

(52) U.S. Cl.
CPC ......... *H01M 50/446* (2021.01); *H01M 4/628* (2013.01); *H01M 10/0525* (2013.01);
(Continued)

(58) Field of Classification Search
None
See application file for complete search history.

(56) References Cited

U.S. PATENT DOCUMENTS 6,306,545 B1    10/2001  Carlson
6,423,444 B1    7/2002   Ying et al.
(Continued)

FOREIGN PATENT DOCUMENTS

CN    104868156 A    8/2015
CN    107123766 A    9/2017
(Continued)

OTHER PUBLICATIONS

European Patent Office, Rijswijk, Netherlands, International Search Report of International Application No. PCT/US2020/058094, Mailed Feb. 1, 2021, 4 pages.
(Continued)

*Primary Examiner* — Gregg Cantelmo
(74) *Attorney, Agent, or Firm* — Dickinson Wright PLLC

(57) ABSTRACT

An electrochemical cell that includes a positive electrode with an active material acting as a cathode; a negative electrode with an active material acting as an anode; a non-aqueous electrolyte; and a separator placed between the positive electrode and negative electrode. In one embodiment, the separator includes an inorganic material, i.e., a type of boehmite, formed of nanometer-sized particles and optionally one or more binders and/or ceramic particles. In a second embodiment, at least one of the cathode, the anode, the electrolyte, and the separator includes the boehmite particles, which absorb one or more of moisture and/or
(Continued)

hydrogen fluoride that become present in the cell. One or more of the cells may be combined in a housing to form a lithium-ion secondary battery.

19 Claims, 12 Drawing Sheets

(52) U.S. Cl.
CPC ..... *H01M 10/4235* (2013.01); *H01M 50/204* (2021.01); *H01M 50/431* (2021.01); *H01M 50/434* (2021.01); *H01M 50/449* (2021.01); *H01M 50/451* (2021.01)

(56) References Cited

U.S. PATENT DOCUMENTS

| | | | |
|---|---|---|---|
| 2002/0092155 A1* | 7/2002 | Carlson | H01M 50/434 |
| | | | 429/251 |
| 2011/0039145 A1* | 2/2011 | Abe | H01M 50/491 |
| | | | 429/247 |
| 2016/0380307 A1* | 12/2016 | Akita | H01M 10/0525 |
| | | | 429/144 |

FOREIGN PATENT DOCUMENTS

| | | | | |
|---|---|---|---|---|
| CN | 109891633 A | 6/2019 | | |
| EP | 3067981 A1 | 9/2016 | | |
| WO | WO-2016079581 A1 * | 5/2016 | ........ | H01M 10/0525 |
| WO | 2019075457 A2 | 4/2019 | | |

OTHER PUBLICATIONS

Xu Ruijie et al., "Boehmite-Coated Microporous Membrane for Enhanced Electrochemical Performance and Dimensional Stability of Lithium-Ion Batteries," Journal of Solid State Electrochemistry, Springer, Berlin, Germany, vol. 22, No. 3, Oct. 23, 2017, pp. 739-747, XP036417568, ISSN: 1432-8488, DOI: 10.1007/S10008-017-3780-3.

Holtmann J. et al., "Boehmite-Based Ceramic Separator for Lithium-Ion Batteries," Journal of Applied Electrochemistry, Springer, Dordrecht, Netherlands, vol. 46, No. 1, Oct. 7, 2015, pp. 69-76, XP035911952, ISSN: 0021-891X, DOI: 10.1007/S10800-015-0895-Z.

* cited by examiner

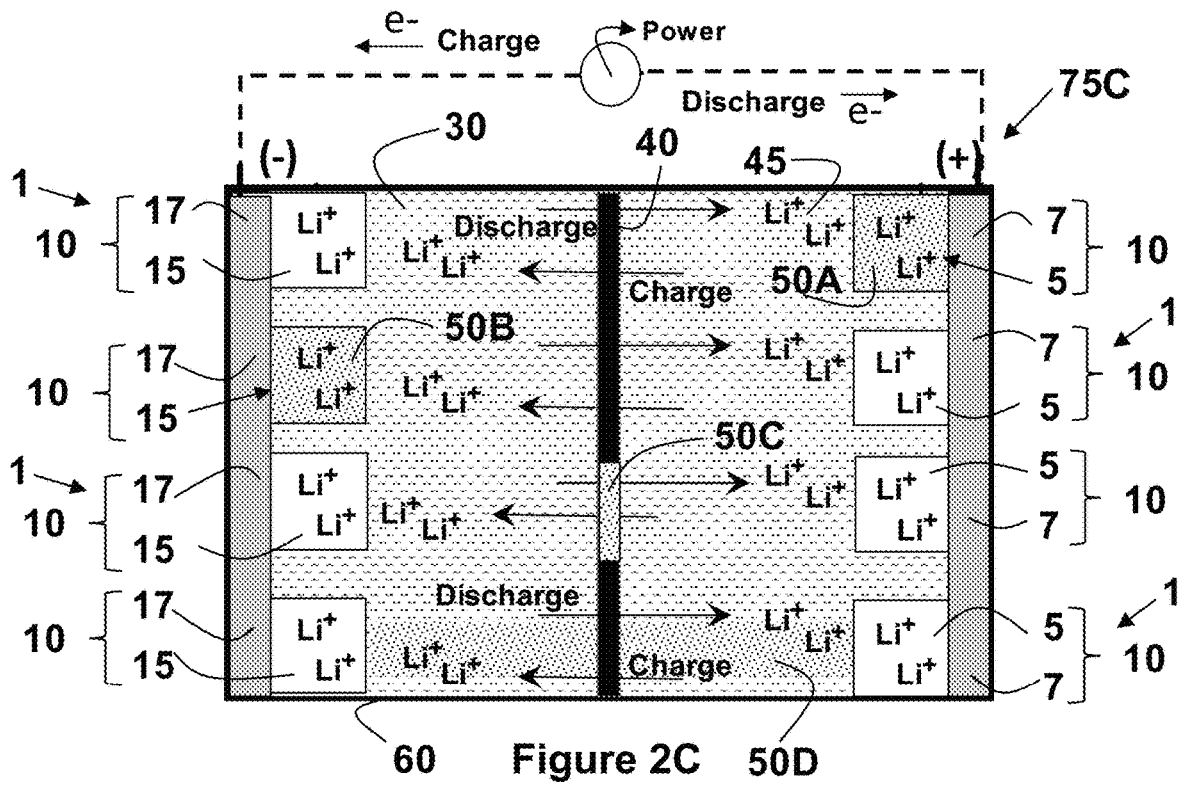
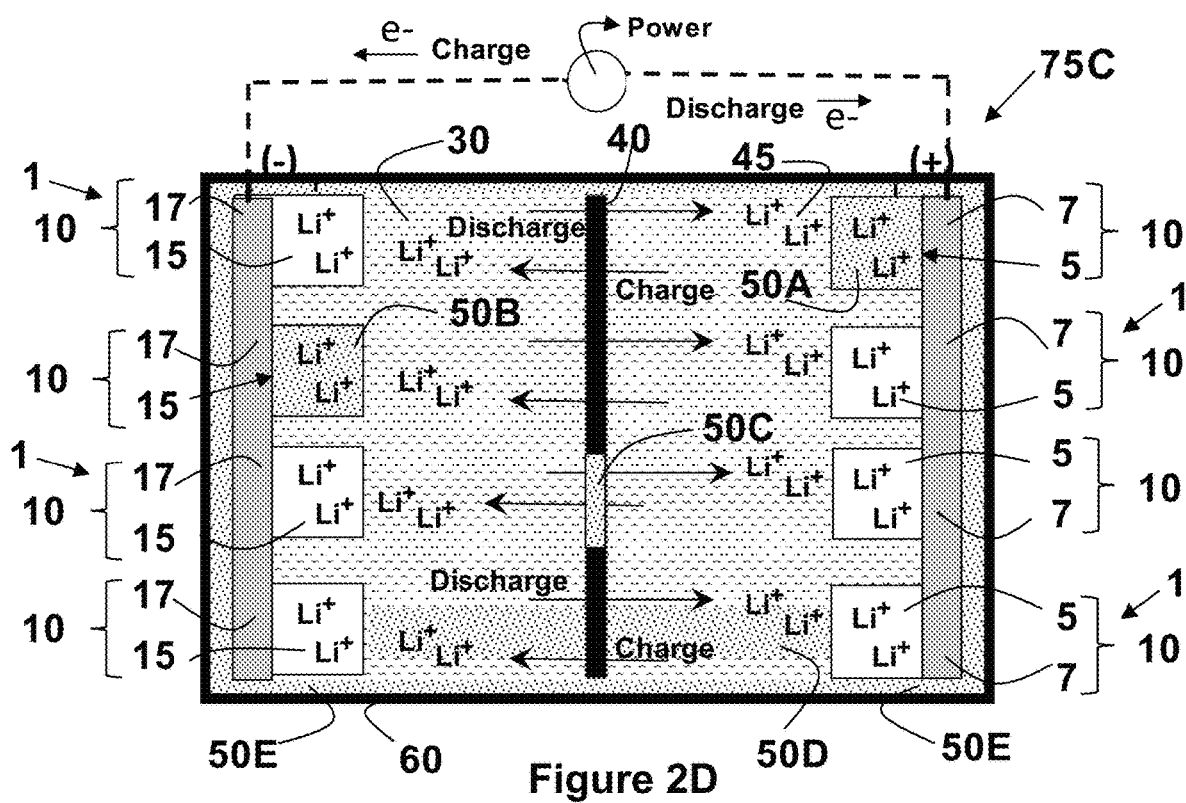

INORGANIC MATERIALS FOR COMPOSITE SEPARATOR IN ELECTROCHEMICAL CELLS

CROSS REFERENCE TO RELATED APPLICATIONS

This application is a national stage filing of International Application No. PCT/US2020/058094 filed on Oct. 30, 2020, designating the United States and published in English, which claims the benefit of the filing date under 35 U.S.C. § 119 (e) of U.S. Provisional Application No. 62/928,511 filed on Oct. 31, 2019 and U.S. Provisional Application No. 62/928,526 filed on Oct. 31, 2019, the entire contents of which are incorporated herein by reference in their entirety.

FIELD

This invention generally relates to inorganic materials, such as inorganic trapping agents or additives, for use in an electrochemical cell, e.g., a lithium-ion secondary battery. More specifically, this disclosure relates to the use of nanometer-sized boehmite particles as inorganic trapping agents or additives located in one or more electrodes (positive or negative), in the separator, or in the electrolyte of a cell used in a lithium-ion secondary battery. According to one aspect of the present disclosure, the use of this type of boehmite is provided as a protective layer on or a protective additive incorporated within a separator in an electrochemical cell.

BACKGROUND

The statements in this section merely provide background information related to the present disclosure and may not constitute prior art.

The main difference between a lithium-ion battery and a lithium-ion secondary battery is that the lithium-ion battery represents a battery that includes a primary cell and a lithium-ion secondary battery represents a battery that includes secondary cell. The term "primary cell" refers to a battery cell that is not easily or safely rechargeable, while the term "secondary cell" refers to a battery cell that may be recharged. As used herein a "battery cell" or "cell" refers to the basic electrochemical unit of a battery that contains the electrodes, separator, and electrolyte. In comparison, a "battery" refers to a collection of cell(s), e.g., one or more cells, and includes a housing, electrical connections, and possibly electronics for control and protection.

Since lithium-ion (e.g., primary cell) batteries are not rechargeable, their current shelf life is about three years, after that, they are worthless. Even with such a limited lifetime, lithium batteries can offer more in the way of capacity than lithium-ion secondary batteries. Lithium batteries use lithium metal as the anode of the battery unlike lithium ion batteries that can use a number of other materials to form the anode.

One key advantage of lithium-ion secondary cell batteries is that they are rechargeable several times before becoming ineffective. The ability of a lithium-ion secondary battery to undergo the charge-discharge cycle multiple times arises from the reversibility of the redox reactions that take place. Lithium-ion secondary batteries, because of the high energy density, are widely applied as the energy sources in many portable electronic devices (e.g., cell phones, laptop computers, etc.), power tools, electric vehicles, and grid energy storage.

In operation, an electrochemical cell, such as a secondary cell for a lithium-ion battery, generally includes a negative electrode, a non-aqueous electrolyte, a separator, a positive electrode, and a current collector for each of the electrodes. All of these components are sealed in a case, an enclosure, a pouch, a bag, a cylindrical shell, or the like (generally called the battery's "housing"). Separators usually are polyolefin membranes with micro-meter-size pores, which prevent physical contact between positive and negative electrodes, while allowing for the transport of ions (e.g., lithium ions) back and forth between the electrodes. A non-aqueous electrolyte, which is a solution of a metal salt, such as a lithium salt, is placed between each electrode and the separator.

Since a polyolefin membrane, such as, for example, polyethylene (PE) and polypropylene (PP), is poorly wet by the non-aqueous electrolyte, the impedance for ion transport increases and results in a poor high-rate capability. More importantly, the polyolefin membrane may be subject to shrinkage at an elevated temperature during the operation of an electrochemical cell (e.g., a secondary cell of a lithium-ion battery), thereby, increasing the risk of a short circuit and leading eventually to a possible occurrence of a fire or explosion. Furthermore, the softness of the polyolefin membrane allows for the growth and penetration of dendrites, e.g., lithium dendrites, which adds to the concern for safety. The ability to enhance the wettability of the membrane, reduce the shrinkage of the membrane during operation, and limit or eliminate the potential for a fire or explosion is desirable.

Conventional high-energy, high-rate, and low-cost goals for the construction and use of an electrochemical process, such as that found in secondary lithium-ion batteries, requires that the separator be relatively thin and able to be manufactured at a low cost. One way to make the separator naturally thinner is to incorporate inorganic particles. However, such particles usually are difficult to disperse in order to form uniform membranes. The use of dispersants and cross-link agents may be added to avoid this aggregation issue. However, the use of such dispersants and cross-linking agents will increase the overall manufacturing cost and provide additional safety concerns associated with using the electrochemical cell.

During operation, it is desirable that the Coulombic or current efficiency and the discharge capacity exhibited by the battery remains relatively constant. The Coulombic efficiency describes the charge efficiency by which electrons are transferred within the battery. The discharge capacity represents the amount of charge that may be extracted from a battery. Lithium-ion secondary batteries may experience a degradation in capacity and/or efficiency due to prolonged exposure to moisture (e.g., water), hydrogen fluoride (HF), and dissolved transition-metal ions ($TM^{n+}$) introduced by HF attacking. In fact, the lifetime of a lithium-ion secondary battery can become severely limited once 20% or more of the original reversible capacity is lost or becomes irreversible. The ability to prolong the rechargeable capacity and overall lifetime of lithium-ion secondary batteries can decrease the cost of replacement and reduce the environmental risks for disposal and recycling.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

FIG. 2C is a schematic representation of a lithium-ion secondary battery formed according to the teachings of the present disclosure showing the layering of the secondary cells of FIGS. 1C-1F to form a larger mixed cell.

FIG. 2D is a schematic representation of the lithium-ion secondary battery of FIG. 2C in which an inorganic additive further forms a coating on the internal wall of the housing.

Figure 1A:
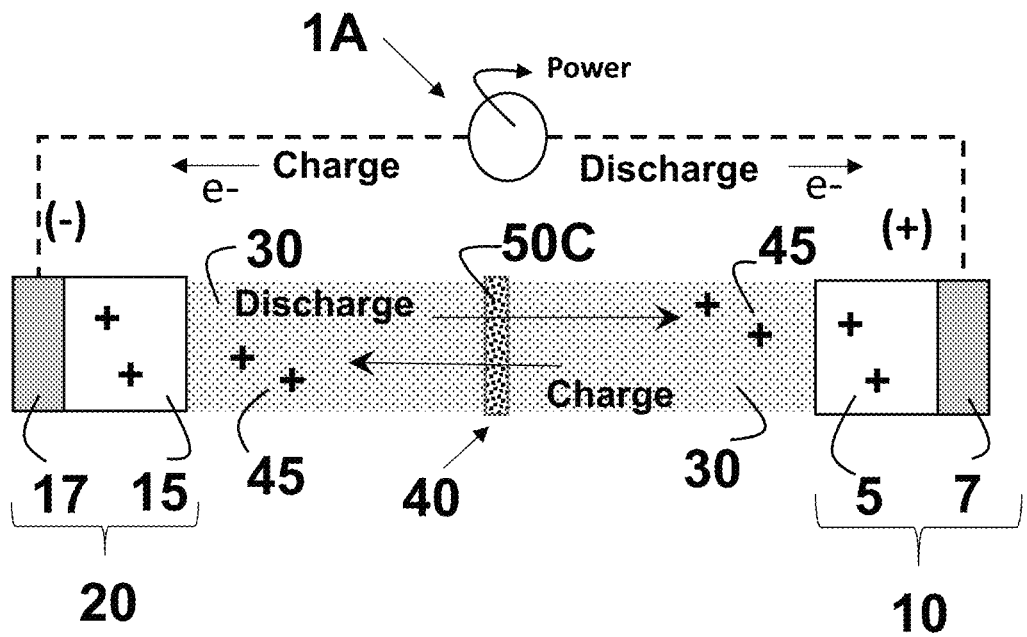
FIG. 1A is a schematic representation of an electrochemical cell formed according to the teachings of the present disclosure in which an inorganic material forms a coating on the separator.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the boehmite materials made and used according to the teachings contained herein is described throughout the present disclosure in conjunction with a secondary cell for use in a lithium-ion secondary battery in order to more fully illustrate the structural elements and the use thereof. The incorporation and use of such inorganic materials in other applications, including without limitation in other electrochemical cells, such as for example a primary cell used in a lithium-ion battery is contemplated to be within the scope of the present disclosure. It should be understood that throughout the description and drawings, corresponding reference numerals indicate like or corresponding parts and features.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

According to a first embodiment of the present disclosure, a separator is provided that includes an inorganic material that comprises, consists essentially of, or consists of a type of boehmite, or a mixture thereof. The inorganic materials of the present disclosure address and overcome concerns relative to existing art by being in the form of nano-sized particles. These nano-sized inorganic particles may be dispersed in a polymeric separator as fillers or applied as an additive in a coating layer. The nano-sized inorganic particles of the present disclosure are beneficial because (1) they are highly dispersible in aqueous-based solutions and (2) they show a binding property to the polymeric membrane over a specific pH range.

In addition, the inorganic materials in this first embodiment of the present disclosure incorporated with the separator (e.g., polymeric membrane) either as an additive within the separator or as a coating applied to the surface of the separator may act as fillers for the polymeric membrane or in the applied protective coating layer. Thus, the inorganic materials may strengthen the polymer membrane, prevent heating shrinkage, and improve electrolyte wetting. The inorganic material may also be capable of mitigating dendrite formation and retarding the potential occurrence of a fire or explosion. When desired, a plurality of ceramic particles may be added to the inorganic material as further discussed herein for incorporation with the polymeric membrane that may provide additional support in overcoming conventional concerns regarding safety Referring to FIG. 1A, an electrochemical cell 1A according to the first embodiment of the present disclosure generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that ions 45 flow from the cathode 5 to the anode 15 when the cell 1 is charging. Similarly, the negative electrode 20 comprises an active material that acts as an anode 15 for the cell 1 and a current collector 17 that is in contact with the anode 15, such that ions 45 flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

Figure 1B:
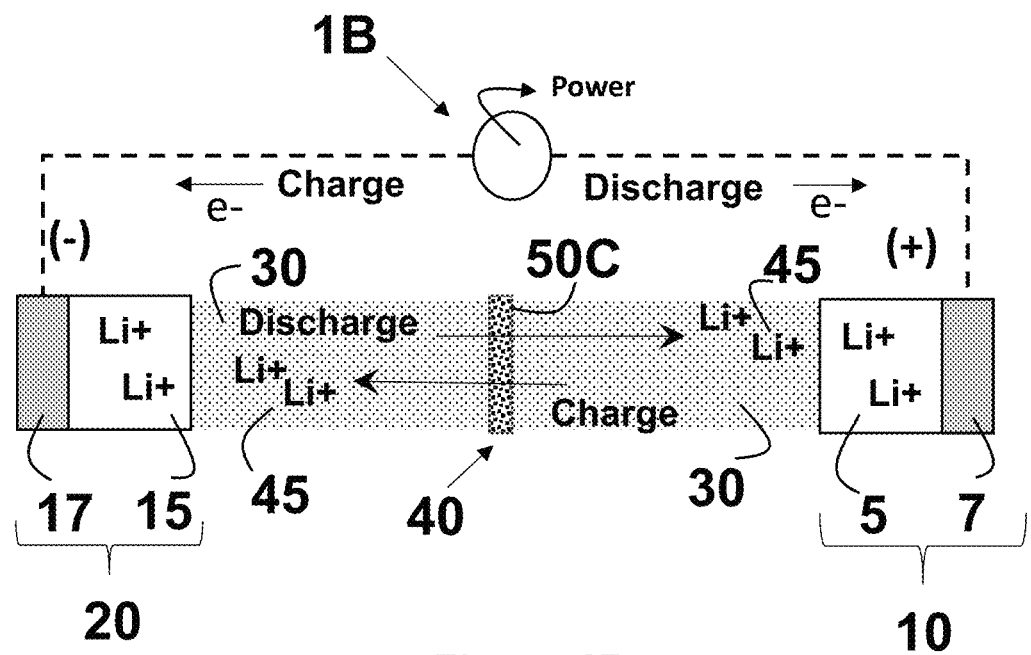
FIG. 1B is a schematic representation of the electrochemical cell of FIG. 1A shown as a lithium-ion secondary cell formed according to the teachings of the present disclosure in which an inorganic material forms a coating on the separator.
Figure 1C:
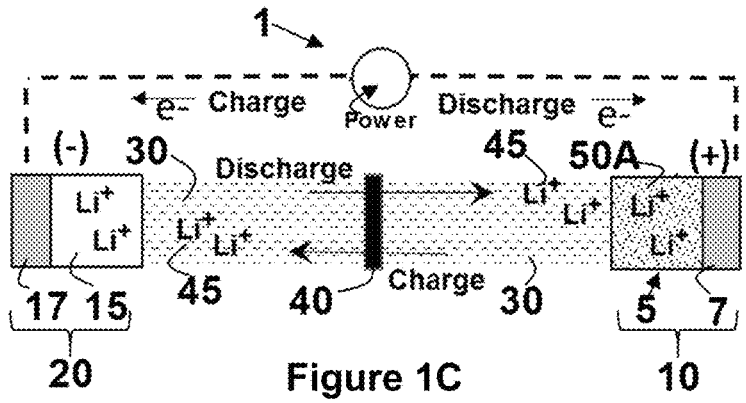
FIG. 1C is a schematic representation of a lithium-ion secondary cell formed according to the teachings of the present disclosure in which an inorganic additive forms a portion of the positive electrode.
Figure 1D:
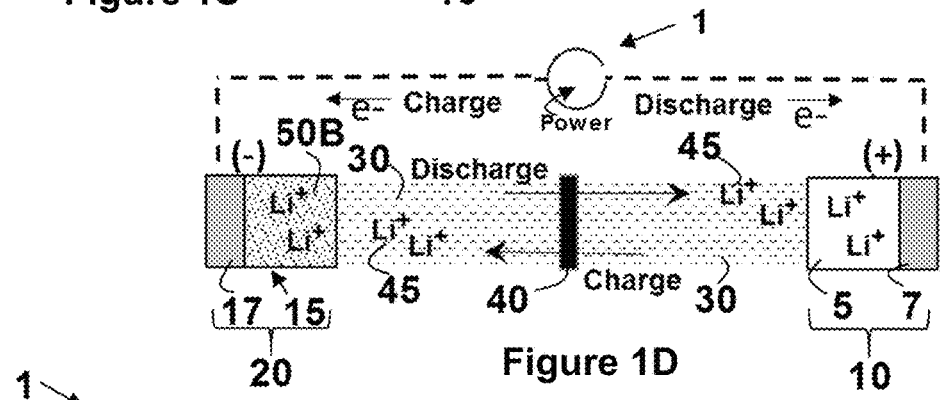
FIG. 1D is a schematic representation of another lithium-ion secondary cell formed according to the teachings of the present disclosure in which an inorganic additive forms a portion of the negative electrode.
Figure 1E:
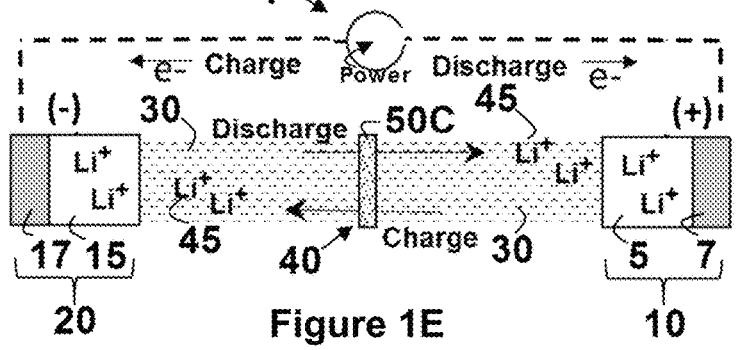
FIG. 1E is a still another schematic representation of a lithium-ion secondary cell formed according to the teachings of the present disclosure in which an inorganic additive is dispersed within the electrolyte.
Figure 1F:
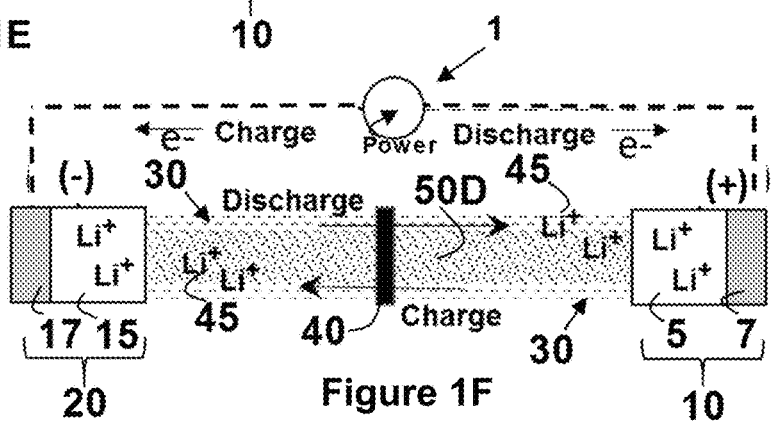
FIG. 1F is a still another schematic representation of a lithium-ion secondary cell formed according to the teachings of the present disclosure in which an inorganic additive is dispersed within the electrolyte.

Referring now to FIG. 1B according to the first embodiment of the present disclosure, the electrochemical cell 1A of FIG. 1A is shown as a secondary cell 1B for use in a lithium-ion secondary battery. In this specific application, the ions 45 that reversibly flow between the anode 15 and the cathode 5 are lithium ions ($Li^+$).

Referring now to both FIGS. 1A and 1B, the non-aqueous electrolyte 30 is positioned between and in contact with, i.e., in fluid communication with, both the negative electrode 20 and the positive electrode 10. This non-aqueous electrolyte 30 supports the reversible flow of ions 45 (e.g., Lithium-ions) between the positive electrode 10 and the negative electrode 20. The separator 40, which comprises a polymeric membrane, is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of the ions 45 there through.

Still referring to FIGS. 1A and 1B, the inorganic material 50C is included as part of the separator 40. This inorganic material 50C is selected to be a type of boehmite or a mixture thereof that is either dispersed as an additive within at least a portion of the structure of the separator 40 or applied as a coating or as an additive in a coating to a portion of a surface of the separator 40; alternatively, to one-side of the of the separator 40; alternatively, to both-sides of the separator 40.

The inorganic material 50C of the present disclosure comprises at least one different type of boehmite particles. The amount of the inorganic material 50C present in the cell 1A, 1B may be up to 100 wt. %; alternatively, up to 50 wt. %; alternatively, between 1 wt. % and 50 wt. %, relative to the overall weight of the separator. These boehmite particles may exhibit an average particle size ($D_{50}$) that is in the range of about 1 nanometer (nm) to 1,000 nanometers (nm); alternatively, less than 1,000 nanometers (nm); alternatively about 5 nanometers (nm) to about 750 nanometers (nm); alternatively, less than 500 nm; alternatively, about 10 nm to about 500 nanometers (nm). Scanning electron microscopy (SEM) or other optical or digital imaging methodology known in the art may be used to determine the shape and/or morphology of the inorganic material. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

According to a second embodiment of the present disclosure, an inorganic material is provided that comprises, consists essentially of, or consists of boehmite particles that can absorb malicious species, such as moisture ($H_2O$) and/or hydrogen fluoride (HF), which may become present or formed within the housing of a lithium-ion secondary battery. The removal of these malicious species prolongs the battery's calendar and cycle lifetime when the inorganic material is applied to, at least one of, the electrolyte, separator, positive electrode, and negative electrode. The inorganic material may also be applied to the inner wall of the housing of the lithium-ion secondary battery.

In order to solve the problems discussed above, the inorganic material in this second embodiment acts as a trapping agent or scavenger for the malicious species present within the housing of the battery. The inorganic material accomplishes this objective by effectively absorbing moisture, free transition-metal ions, and/or hydrogen fluoride (HF) selectively, while having no effect on the performance of the non-aqueous electrolyte, including the lithium-ions and organic transport medium contained therein. The multifunctional inorganic particles may be introduced into the lithium-ion secondary battery or each cell therein as at least one of an additive to the positive electrode, an additive to negative electrode, and additive to the non-aqueous electrolyte, and as a coating material applied to the separator.

Referring to FIGS. 1C to 1F, a secondary lithium-ion cell 1 generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that lithium ions 45 flow from the cathode 5 to the anode 15 when the cell 1 is charging. Similarly, the negative electrode 20 comprises an active material that acts as an anode 15 for the cell 1 and a current collector 17 that is in contact with the anode 15, such that lithium ions 45 flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

The non-aqueous electrolyte 30 is positioned between and in contact with, i.e., in fluid communication with, both the negative electrode 20 and the positive electrode 10. This non-aqueous electrolyte 30 supports the reversible flow of lithium ions 45 between the positive electrode 10 and the negative electrode 20. The separator 40 is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of lithium ions 45 there through.

Still referring to FIGS. 1C to 1F, at least one of the cathode 5, the anode 15, the electrolyte 30, and the separator 40 includes an inorganic additive 50A, 50B, 50C, or 50D that absorbs one or more of moisture, free transition metal ions, or hydrogen fluoride (HF), as well as other malicious species that become present in the cell. Alternatively, the inorganic additive 50A, 50B, 50C, or 50D selectively absorbs moisture, free transition metal ions, and/or hydrogen fluoride (HF). According to this aspect of the present disclosure, the inorganic additive 50A, 50B, 50C, or 50D may be selected to be a type of boehmite having nanometer-sized particles as previously described above.

Referring now to the entirety of the present disclosure, the boehmite used herein refers to alpha alumina monohydrate and materials that are commonly referred to in the art as pseudo-boehmite. These boehmites or alumina monohydrates are in the alpha form, and include relatively little, if any, hydrated phases other than monohydrates. The boehmites may be formed from gibbsite by diagenesis or hydrothermal alteration. The boehmites may be dry milled, e.g., ball milled, attritor milled, jet milled, roll crushed, and combinations thereof.

The inorganic material 50A-50D may also exhibit surface area that is in the range of about 2 $m^2/g$ to about 5000 $m^2/g$; alternatively from about 5 $m^2/g$ to about 2500 $m^2/g$; alternatively, from about 10 $m^2/g$ to about 1000 $m^2/g$; alternatively, about 25 $m^2/g$ to about 750 $m^2/g$. The pore volume of the inorganic material 50A-50D may be in the range of about 0.05 cc/g to about 3.0 cc/g; alternatively, 0.1 cc/g to about 2.0 cc/g. The measurement of surface area and pore volume for the inorganic material may be accomplished using any known technique, including without limitation, microscopy, small angle x-ray scattering, mercury porosimetry, and Brunauer, Emmett, and Teller (BET) analysis. Alternatively, the surface area and pore volume is determined using Brunauer, Emmett, and Teller (BET) analysis.

The inorganic material 50A-50D may include a sodium (Na) concentration of about 0.01 wt. % to about 2.0 wt. % based on the overall weight of the inorganic material. Alternatively, the Na concentration may range from about 0.1 wt. % to about 1.0 wt. %. When desirable, the inorganic material may further include one or more doping elements selecting from Li, K, Mg, Cu, Ni, Zn, Fe, Ce, Sm, Y, Cr, Eu, Er, Ga, Zr, Si, and Ti.

The inorganic material 50C is dispersible in aqueous-based solutions that have a pH that is in the range from about 3.0 to about 11.0; alternatively, in the range from about 4.0 to about 10.0. The aqueous-based solution may be part of the coating formulation used to apply the inorganic material 50C to the surface of the separator 40.

When the inorganic material 50C is applied as a coating, the coating formulation may also comprise an organic binder, such that the inorganic material accounts for about 10 wt. % to 99 wt. %; alternatively from about 15 wt. % to 95 wt. % of the overall weight of the coating. This organic binder may include, but not be limited to polyvinyl alcohol (PVA), polyethylene oxide (PEO), polyvinylpyrrolidone (PVP), polypropylene oxide (PPO), polyacrylic acid (PAA), carboxymethyl cellulose (CMC), sodium ammonium alginate (SAA), or a mixture thereof.

According to another aspect of the present disclosure, the inorganic material 50C or the coating formulation that includes the inorganic material 50C may also comprise one or more ceramic particles, such that the mass ratio of the boehmites to the ceramic particles ranges from 1:10 to 10:1. These ceramic particles may comprise, without limitation, silica, alumina, magnesium oxide, titanium oxide, zirconium oxide, alumina silicate, calcium silicate, magnesium silicate, calcium carbonate, kaolin, zeolite, aluminum hydroxide, magnesium hydroxide, perovskite, or a combination thereof. The purpose of these ceramic particles is described in more detail in the following discussion of the polymeric membrane.

The active materials in the positive electrode 10 and the negative electrode 20 may be any material known to perform this function in an electrochemical cell, e.g., in a secondary cell of a lithium-ion battery. The active material used in the positive electrode 10 may include, but not be limited to lithium transition metal oxides or transition metal phosphates. Several examples of active materials that may be used in the positive electrode 10 include, without limitation, $LiCoO_2$, $LiNi_{1-x-y}Co_xMn_yO_2$ (x+y≤⅔), $zLi_2MnO_3 \cdot (1-z)LiNi_{1-x-y}Co_xMn_yO_2$ (x+y≤⅔), $LiMn_2O_4$, $LiNi_{0.5}Mn_{1.5}O_4$, and $LiFePO_4$. The active materials used in the negative electrode 15 may include, but not be limited to graphite and $Li_4Ti_5O_{12}$, as well as silicon and lithium metal. Alternatively, the active material for use in the negative electrode is silicon or lithium metal due to their one-magnitude higher specific capacities. The current collectors 7, 17 in both the positive 10 and negative 20 electrodes may be made of any metal known in the art for use in an electrode of an electrochemical cell or lithium battery, such as for example, aluminum for the cathode and copper for the anode. The cathode 5 and anode 15 in the positive 10 and negative 20 electrodes are generally made up of two dissimilar active materials.

The non-aqueous electrolyte 30 is selected, such that it supports the oxidation/reduction process and provides a medium for ions 45 (e.g., lithium-ions) to flow between the anode 15 and cathode 5. The non-aqueous electrolyte 30 may be a solution of an inorganic salt in an organic solvent. Several specific examples of lithium salts used in the secondary cell of a lithium battery, include, without limitation, lithium hexafluorophosphate ($LiPF_6$), lithium bis(oxalato)borate (LiBOB), and lithium bis(trifluoro methane sulfonyl) imide (LiTFSi). The inorganic salts may form a solution with an organic solvent, such as, for example, ethylene carbonate (EC), ethyl methyl carbonate (EMC), diethyl carbonate (DEC), dimethyl carbonate (DMC), propylene carbonate (PC), vinylene carbonate (VC), and fluoroethylene carbonate (FEC), to name a few. A specific example of an electrolyte for use in a secondary cell of a lithium battery is a 1 molar solution of $LiPF_6$ in a mixture of ethylene carbonate and diethyl carbonate (EC/DEC=50/50 vol.).

The separator 40 ensures that the anode 15 and cathode 5 do not touch and allows ions 45 to flow there through. The separator 40 may be a polymeric membrane comprising, without limitation, polyolefin-based materials with semi-crystalline structure, such as polyethylene, polypropylene, and blends thereof, as well as micro-porous poly(methyl methacrylate)-grafted, siloxane grafted polyethylene, and polyvinylidene fluoride (PVDF) nanofiber webs. Alternatively, the polymeric membrane is polyolefin, such as polyethylene, polypropylene, or a blend thereof.

A separator 40 plays a significant role in the safety, durability, and high-rate performance of an electrochemical cell, such as a secondary cell for a lithium-ion battery. A polymeric membrane is electrically insulating and separates the positive and negative electrodes completely to avoid an internal short circuit. The polymeric membrane usually is not ionically conductive, but rather has large pores filled with the non-aqueous electrolyte, allowing for the transport of ions.

Figure 2A:
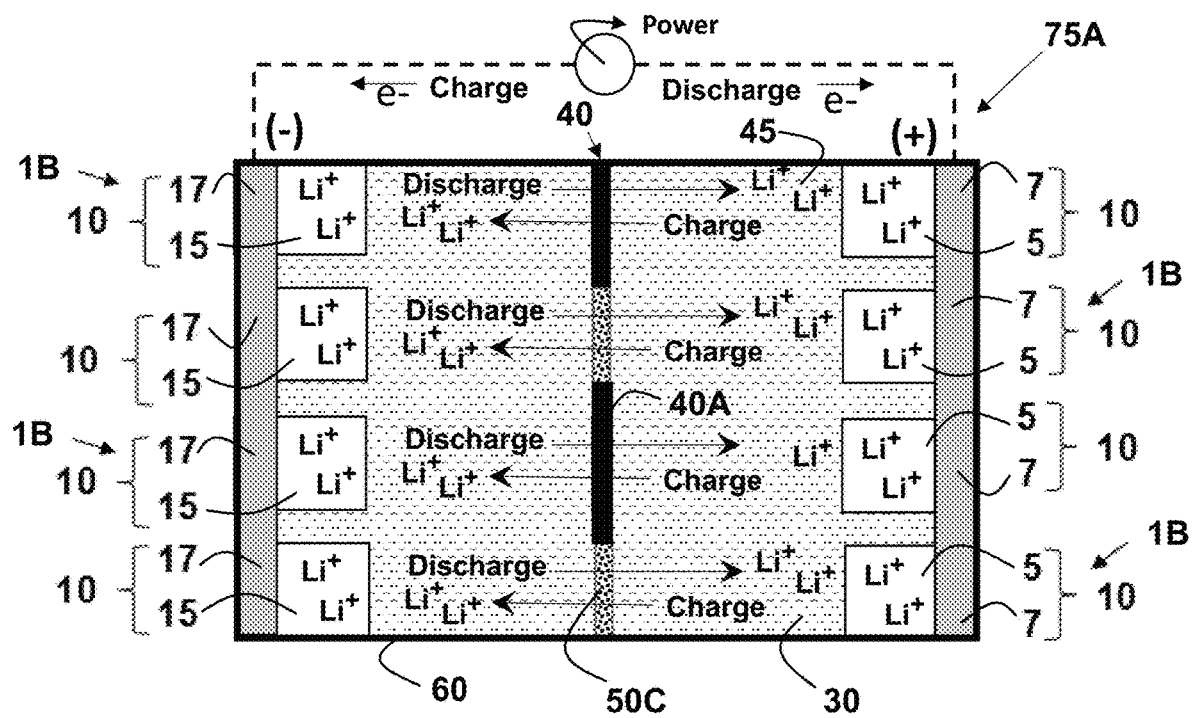
FIG. 2A is a schematic representation of a lithium-ion secondary battery formed according to the teachings of the present disclosure showing the layering of four secondary cells including two of the secondary cells of FIG. 1B to form a larger mixed cell.
Figure 2B:
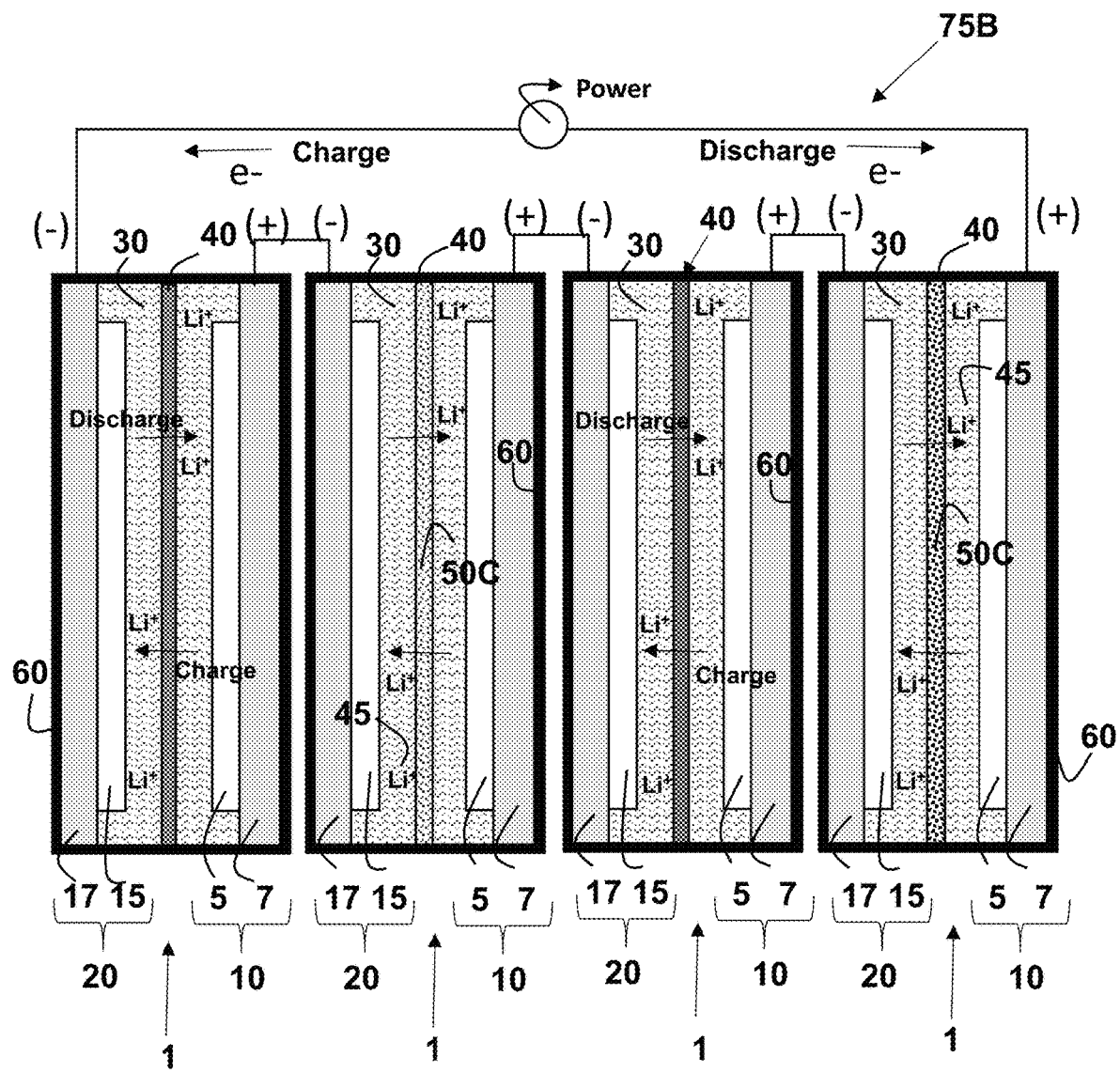
FIG. 2B is a schematic representation of a lithium-ion secondary battery formed according to the teachings of the present disclosure showing the incorporation of four secondary cells including two of the secondary cells of FIG. 1B in series.
Figure 3A:
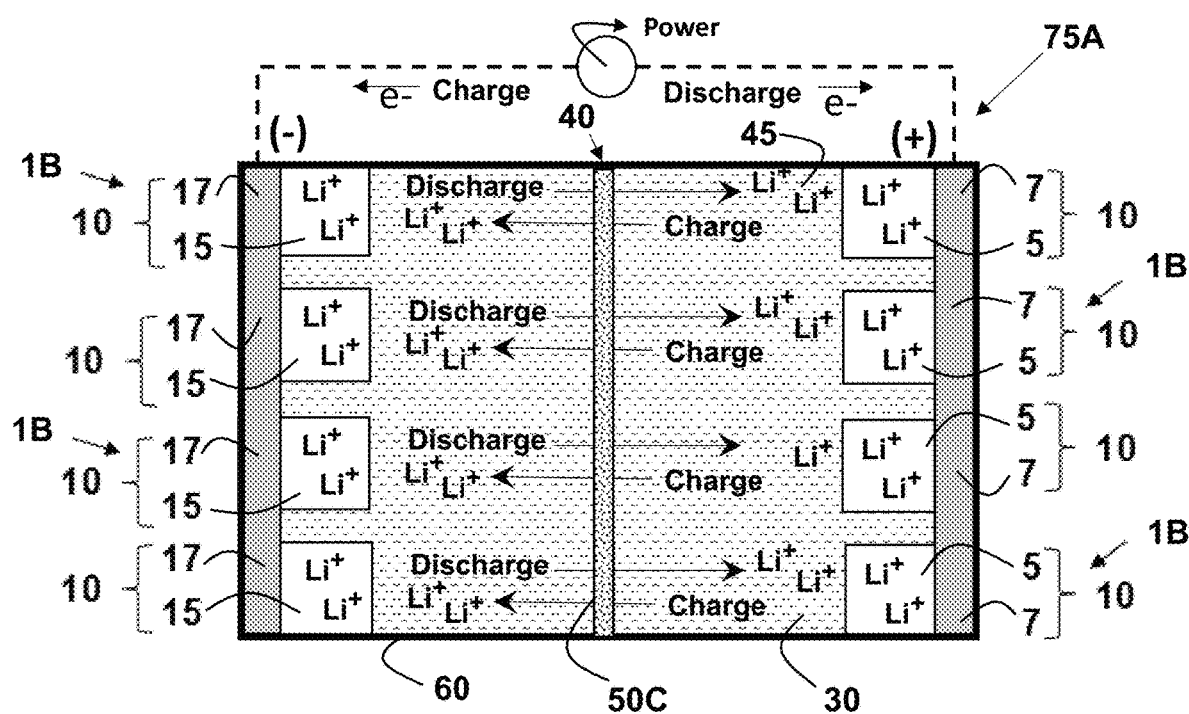
FIG. 3A is a schematic representation of another lithium-ion secondary battery showing the layering of four secondary cells including four of the secondary cells of FIG. 1B to form a larger mixed cell.
Figure 3B:
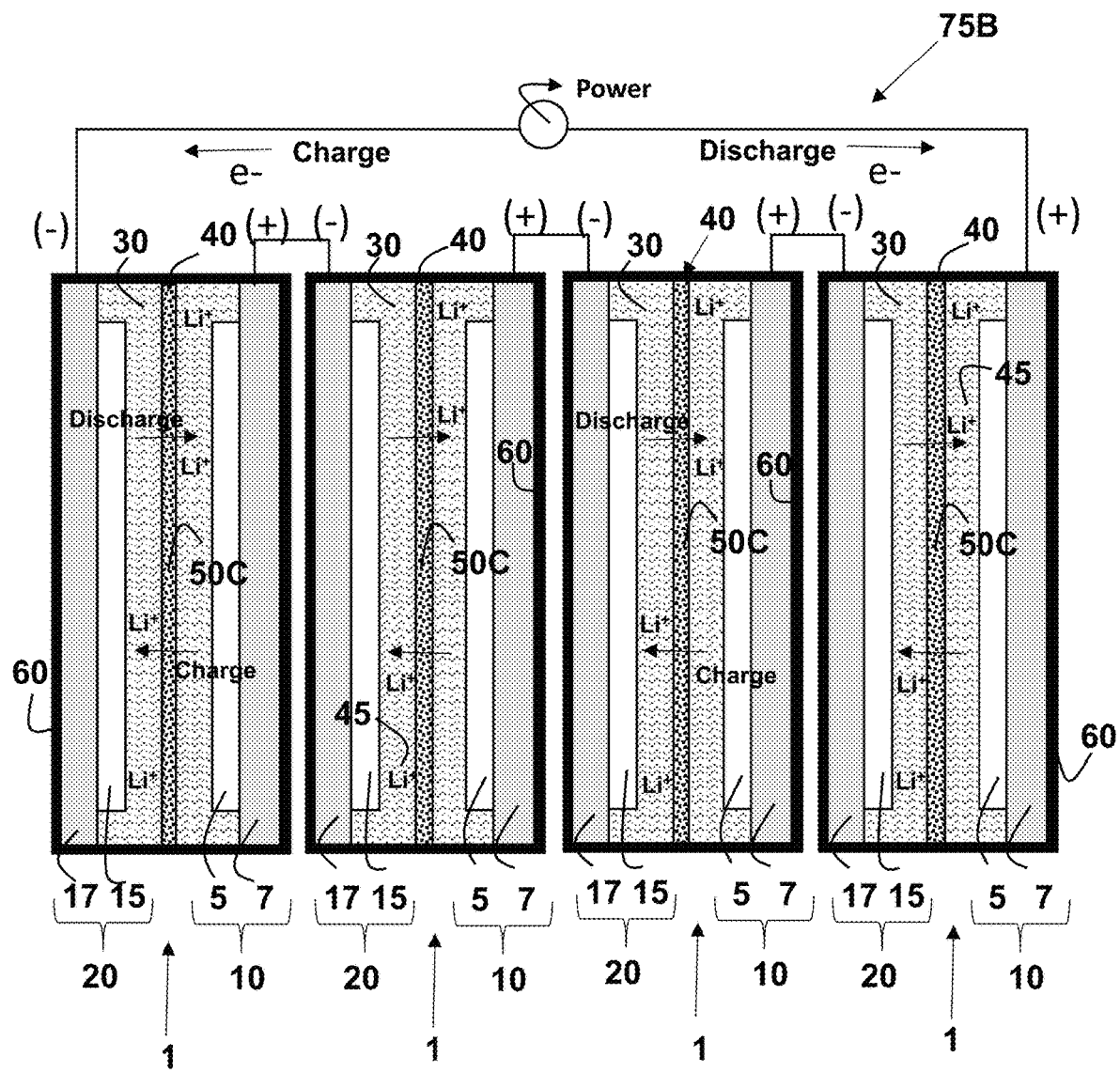
FIG. 3B is a schematic representation of another lithium-ion secondary battery formed according to the teachings of the present disclosure showing the incorporaiton of four secondary cells including four of the secondary cells of FIG. 1B in series.

According to a third embodiment of the present disclosure, one or more secondary cells may be combined to form an electrochemical cell, such as a lithium-ion secondary battery. In FIGS. 2A and 3A, an example of such a battery 75A is shown in which four (4) secondary cells 1 are layered to form a larger single secondary cell that is encapsulated to produce the lithium-ion secondary battery 75A. In FIGS. 2B and 3B, another example of a battery 75B is shown, in which four (4) secondary cells are stacked or placed in series to form a larger capacity battery 75B with each cell being individually contained.

Referring specifically to FIGS. 2A, 2B, 3A, and 3B, an example of such a battery 75A, 75B is shown in which the two (2) secondary cells of FIG. 1B (see FIGS. 2A, 2B) and four (4) secondary cells of FIG. 1B (see FIGS. 3A, 3B) are combined to form the corresponding battery 75A, 75B. The lithium-ion secondary battery 75A, 75B also includes a housing 60 having an internal wall in which the secondary cells 1 are enclosed or encapsulated in order to provide for both physical and environmental protection. One skilled in the art will understand that although the battery 75A, 75B shown in FIG. 2A or 2B and in FIG. 3A or 3B incorporates two secondary cells and four secondary cells of FIG. 1B, respectively, that such a battery 75A, 75B may include any other number of secondary cells.

One skilled in the art will also appreciate that although FIGS. 2A-3B demonstrate the incorporation of secondary cells 1B into a lithium-ion secondary battery 75A, 75B, the same principles may be used to encompass or encase one or more electrochemical cells 1A into a housing 60 for use in another application. In these electrochemical cells 1A, the inorganic material 50C may be dispersed within at least a portion of the separator 40 or in the form of a coating applied onto a portion of a surface of the separator 40.

Figure 3C:
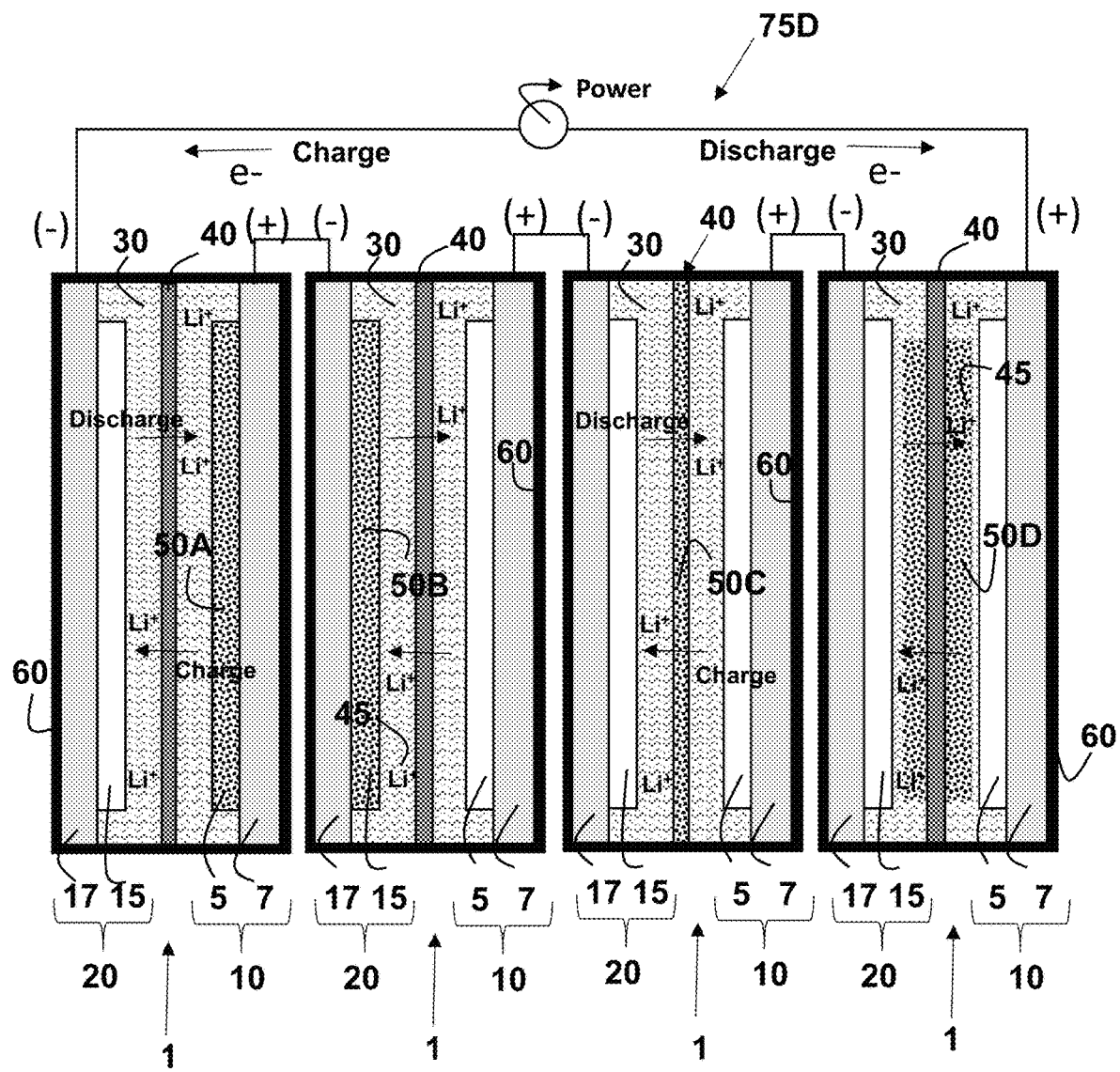
FIG. 3C is a schematic representation of another lithium-ion secondary battery formed according to the teachings of the present disclosure showing the incorporaiton of the secondary cells of FIGS. 1C-1F in series.
Figure 3D:
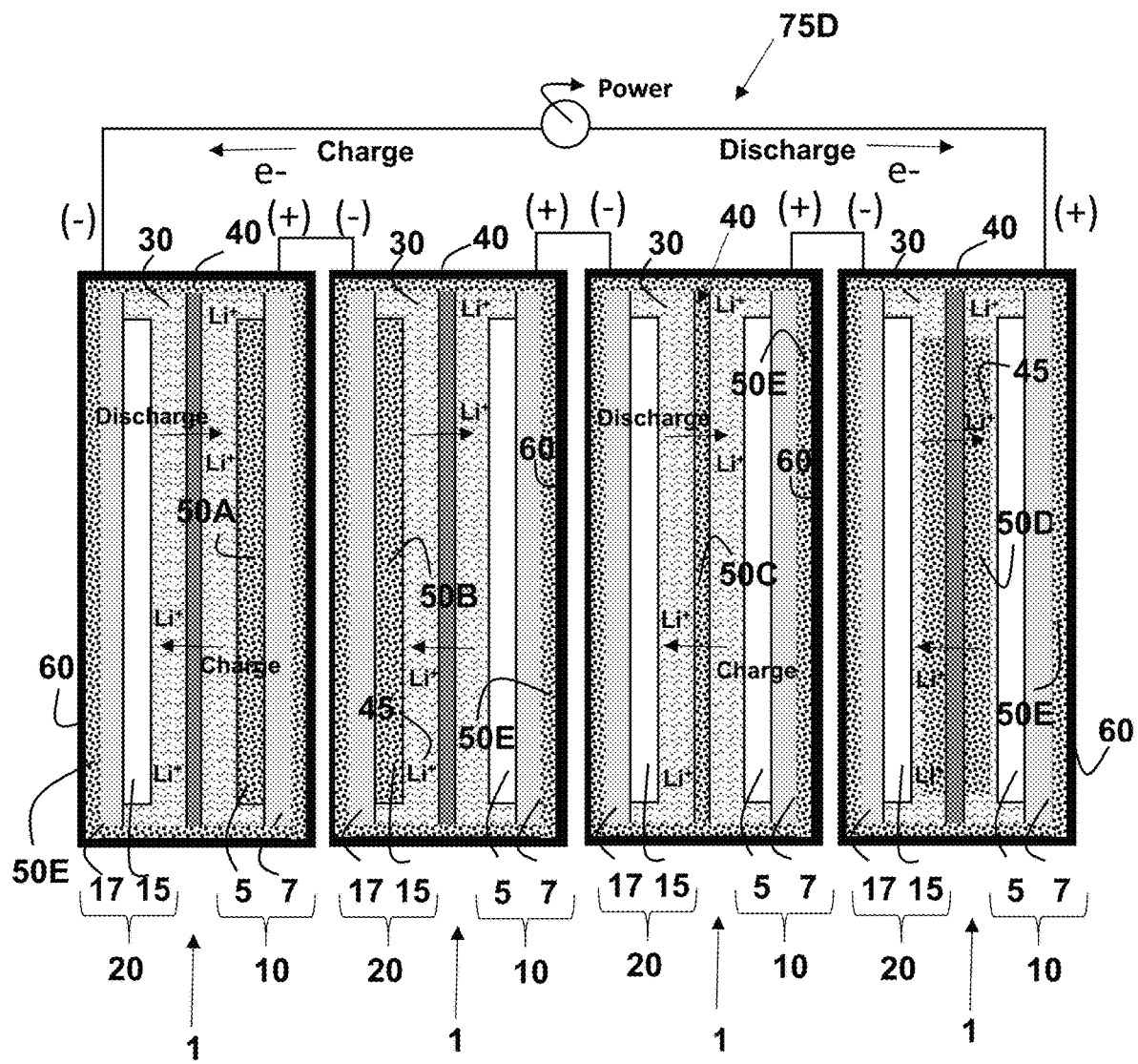
FIG. 3D is a schematic representation of the lithium-ion secondary battery of FIG. 3C in which an inorganic additive further forms a coating on the internal wall of the housing.

According to a fourth aspect of the present disclosure, one or more secondary cells may be combined to form a lithium-ion secondary battery. In FIGS. 2C and 2D, an example of such a battery 75C is shown in which the four (4) secondary cells of FIGS. 1C-1F are layered to form a larger single secondary cell that is encapsulated to produce the battery 75. In FIGS. 3C and 3D, another example of a battery 75D is shown, in which the four (4) secondary cells of FIGS. 1C-1F are stacked or placed in series to form a larger capacity battery 75C with each cell being individually contained. The lithium-ion secondary battery 75C, 75D also includes a housing 60 having an internal wall in which the secondary cells 1 are enclosed or encapsulated in order to provide for both physical and environmental protection. One skilled in the art will understand that although the battery 75C, 75D shown in FIGS. 2C/2D and 3C/3D incorporate the four secondary cells of FIGS. 1C-1F that a battery 75C, 75D may include any other number of cells. In addition, the battery 75C, 75D may include one or more cells in which the inorganic additive is incorporated with the positive electrode (50A, FIG. 1C), the negative electrode (50B, FIG. 1D), the separator (50C, FIG. 1E), or the electrolyte (50D, FIG. 1F). In fact, all of the cells may have the inorganic additive incorporated in the same way, e.g., 50A, 50B, 50C, or 50D. When desirable, the battery 75C, 75D may also include one or more cells in which the inorganic additive 50A, 50B, 50C, or 50D is not incorporated or included provided that at least one of the cells in the battery 75C, 75D incorporates the inorganic additive 50A, 50B, 50C, or 50D.

The housing 60 may be constructed of any material known for such use in the art and be of any desired geometry required or desired for a specific application. For example, lithium-ion batteries generally are housed in three different main form factors or geometries, namely, cylindrical, prismatic, or soft pouch. The housing 60 for a cylindrical battery may be made of aluminum, steel, or the like. Prismatic batteries generally comprise a housing 60 that is rectangular shaped rather than cylindrical. Soft pouch housings 60 may be made in a variety of shapes and sizes. These soft housings may be comprised of an aluminum foil pouch coated with a plastic on the inside, outside, or both. The soft housing 60 may also be a polymeric-type encasing. The polymer composition used for the housing 60 may be any known polymeric materials that are conventionally used in lithium-ion secondary batteries. One specific example, among many, include the use of a laminate pouch that comprises a polyolefin layer on the inside and a polyamide layer on the outside. A soft housing 60 needs to be designed such that the housing 60 provides mechanical protection for the secondary cells 1 present in the battery 75.

Referring now to only FIGS. 2D and 3D, the inorganic additive 50E may also be included as a coating applied onto at least a portion of a surface of the internal wall of the housing 60. When desirable, the inorganic additive 50E applied to the internal wall of the housing 60 may be used along with the inclusion of the inorganic additive 50A-50D, which includes 50C and/or 50C, in one or more of the secondary cells 1 or used separately with secondary cells that do not individually include the inorganic additive 50A-50D.

A variety of factors can cause degradation in lithium-ion secondary batteries. One of these factors is the existence of various malicious species in the non-aqueous electrolyte. These malicious species include moisture (e.g., water or water vapor), hydrogen fluoride (HF), and dissolved transition-metal ions ($TM^{n+}$) introduced by HF attacking.

Moisture in the electrolyte mainly arises as a fabrication residue and from the decomposition of the organic electrolyte. Although a dry environment is desired, the presence of moisture cannot be thoroughly excluded during the production of a battery or battery cell. The organic solvent in the electrolyte is inclined to decompose to yield $CO_2$ and $H_2O$, especially when operated at a high temperature. The water ($H_2O$) can react with a lithium salt, such as $LiPF_6$, resulting in the generation of lithium fluoride (LiF) and hydrogen fluoride (HF). The lithium fluoride (LiF), which is insoluble, can deposit on the surfaces of the active materials of the anode or cathode forming a solid electrolyte interface (SEI). This solid electrolyte interface (SEI) may reduce or retard the lithium-ions (de)intercalation and inactivate the surface of the active material, thereby, leading to a poor rate capability and/or capacity loss.

Hydrogen fluoride (HF), when present, may attack the positive electrode, which contains transition metal and oxygen ions, resulting in the formation of more water and transition metal compounds that are compositionally different from the active material. When water is present and acts as a reactant, the reactions that occur may become cyclic, resulting in continual damage to the electrolyte and the active material. In addition, the transition metal compounds that are formed may be insoluble and electrochemically inactive. These transition metal compounds may reside on the surface of the positive electrode, thereby, forming an SEI. On the other hand, any soluble transition metal compounds may dissolve into the electrolyte resulting in transition metal ions ($TM^{n+}$). These free transition metal ions, such as, for example, $Mn^{2+}$ and $Ni^{2+}$, can move towards the anode where they may be deposited as an SEI leading to the introduction of a variety of different reactions. These reactions, which may consume the active materials of the electrodes and the lithium-ions present in the electrolyte, can also lead to capacity loss in the lithium-ion secondary battery.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Evaluation Method 1—HF Scavenging

The HF scavenging capability of the inorganic additives in the non-aqueous electrolyte, namely 1 M $LiPF_6$ in a mixture of ethylene carbonate and dimethyl carbonate (EC/DMC=50/50 vol.), is analyzed by a Fluoride ISE meter. The electrolyte solution is prepared, such that it contains 100 ppm HF. The inorganic additive in particle form is added as 1 wt. % of the total mass, with the mixture being stirred for 1 minute, then allowed to stand still at 25° C. for 24 hours prior to measuring the decrease of $F^-$ in the solution.

Below are the reactions in a Li-ion battery with moisture residue:

$$LiPF_6 + H_2O \rightarrow HF + LiF\downarrow + H_3PO_4 \text{ and}$$

$$LiMO_2 + HF \rightarrow LiF\downarrow + M^{2+} + H_2O,$$

wherein M stands for a transition metal.

As a result, in order to reduce HF in the electrolyte, the inorganic additive consumes the HF and moisture residue at the same time, thereby, breaking the reaction chain.

Evaluation Method 2—Electrochemical Cell Construction & Evaluation

The separators are fabricated using a monolayer polypropylene membrane (Celgard 2500, Celgard LLC, North Carolina). Separators with and without the inclusion of the inorganic material are constructed for performance comparison. A slurry containing the inorganic material is coated onto the separator in two-side form. The slurry is made of 5-50 wt. % inorganic material particles dispersed in deionized (D.I.) water. The mass ratio of a polymeric binder to the total solids is 1-10%. The coating is 2-15 µm in thickness before drying. The thickness of the coated separator is 25-45 µm.

The slurry for use in coating the separator is made by dispersing the inorganic material (e.g., particles) of the present disclosure in an aqueous solution in the pH range of 3.0-11.0. An organic binder, comprising one or more of polyvinyl alcohol (PVA), polyethylene oxide (PEO), polyvinylpyrrolidone (PVP), polypropylene oxide (PPO), polyacrylic acid (PAA), carboxymethyl cellulose (CMC), and sodium ammonium alginate (SAA) is added to the slurry. The organic binder represents between 1% to 50% by mass, relative to the mass of the inorganic solids in the slurry.

To fabricate films for use with the positive electrode, a slurry is made by dispersing the active material (AM), such as $LiNi_{1/3}Co_{1/3}Mn_{1/3}O_2$, and carbon black (CB) powders in an n-methyl-2-pyrrolidone (NMP) solution of polyvinylidene fluoride (PVDF). The mass ratio of AM:CB:PVDF slurry is 90:5:5. The slurry is blade coated onto aluminum films. After drying, the thickness of each positive electrode film formed is measured to be in the range of 50-150 µm.

Lithium metal foil is used as the negative electrode.

The positive electrode, negative electrode, and separator films are punched into a round disks in diameters of 12, 14, and 19 mm, respectively. They are assembled into 2025-type coin cells for battery performance testing. Coin cell batteries are assembled with separators that included the inorganic material of the present disclosure, as well as with separators that do not include such inorganic materials in order to provide a comparison of the resulting battery performance. The electrolyte, which is a one (1) molar solution of $LiPF_6$ in a mixture of ethylene carbonate and diethyl carbonate (EC/DEC=50/50 vol.) is incorporated into the coin cell batteries.

The coin cell batteries are cycled between 3 and 4.3 V at the current loading of C/5 at 25° C. after two C/10 formation cycles.

Evaluation Method 3—Wettability, Thermal Shrinkage, & Fire Retardancy

The separators formed with and without the inorganic material of the present disclosure are also evaluated with respect to wettability using an LP30 electrolyte (i.e., 1 Molar $LiPF_6$ dissolved in 1:1 ethylene carbonate and diethyl carbonate).

The wettability may be determined by observing the wetting condition when drop the electrolyte solution to the surface of separator membranes. A faster wetting condition indicates a better wettability.

Thermal shrinkage may be determined using a free shrink test. The separators formed with the inorganic material and the bare polypropylene separator are placed in a 150° C. oven for 30 minutes. The amount of shrinkage that occurs is calculated afterwards.

Finally, the separators formed with and without the inorganic material of the present disclosure are evaluated with respect to fire retardancy. A gas lighter is used to ignite the separator membrane. A comparison among the bare polypropylene and inorganic material coated separator were performed.

Example 1—Separator with Boehmite (sample 1)

The properties of boehmite (sample 1) are listed in Table 1. This inorganic additive was found to scavenge 21% HF upon testing.

TABLE 1

| Sample name | | Boehmite (sample 1) |
|---|---|---|
| $Al_2O_3$ | | 83.05 wt. % |
| LOI (1000° C. 1 hour) | | 16.95% |
| Particle size | $D_{10}$ | 9.3 nm |
| | $D_{50}$ | 30.2 nm |
| | $D_{90}$ | 53.4 nm |
| Surface area | | 100.2 m$^2$/g |
| Pore volume | | 0.48 cc/g |

Figure 4:
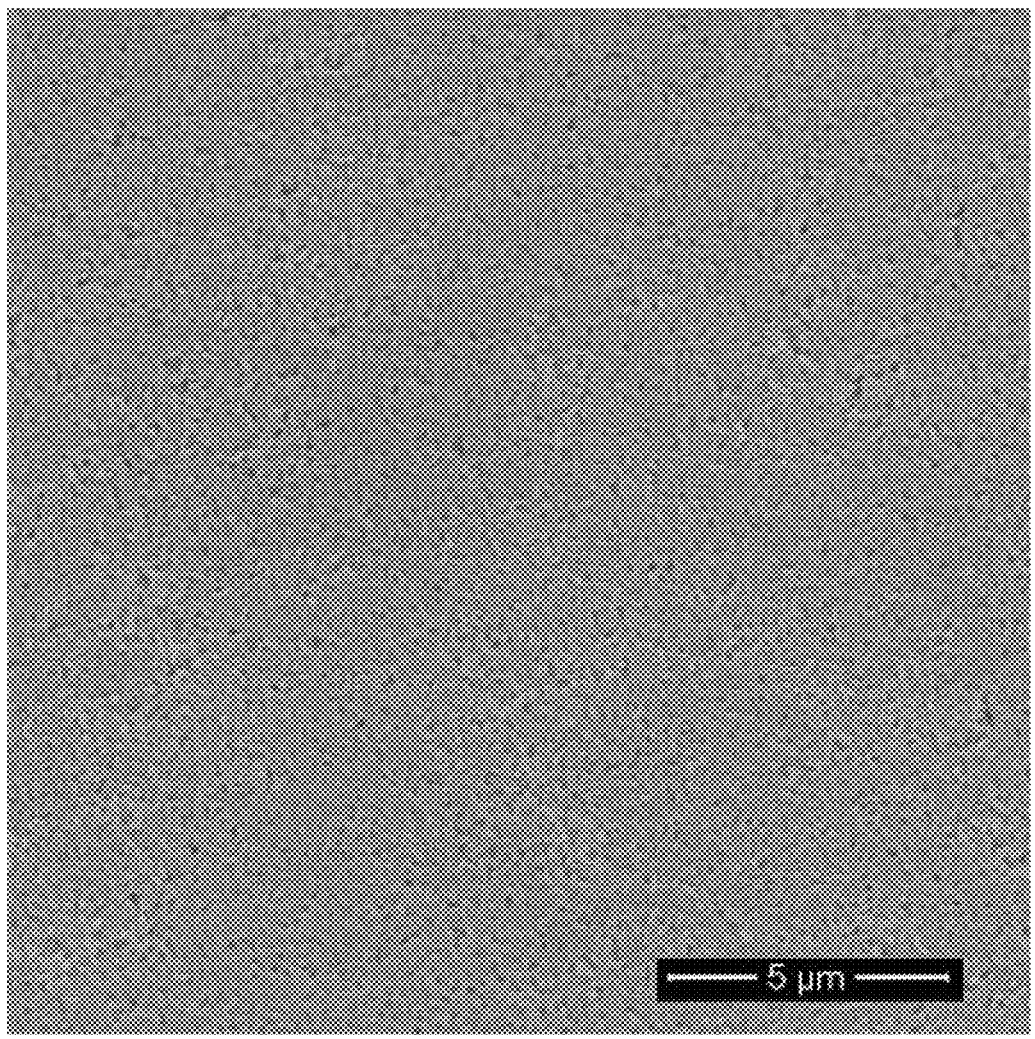
FIG. 4 is a scanning electron micrograph (SEM) image of surface of coated separator of boehmite sample 1.

In order to coat boehmite (sample 1) on to onto Celgard 2500 separator, a slurry is made with magnesium aluminate powder and PVA solution. The weight ratio of inorganic powder to polymer binder is 12.5:1. The solid loading of the slurry is 20%. The slurry is coated in two-side form. The thickness is 7.5 µm for one coating layer. The scanning electron micrograph (SEM) image obtained for the coated separator is shown in FIG. 4.

The boehmite (sample 1) coating largely improves the wettability of the electrolyte to the separator. A conventional polypropylene separator was burned off with fire, while the coated separator remained in a membrane form. In the thermal shrinkage test, the coated separator shrinks 21% after 150° C. treatment, while a shrinkage of 53% is obtained for the conventional polypropylene separator.

Figure 5:
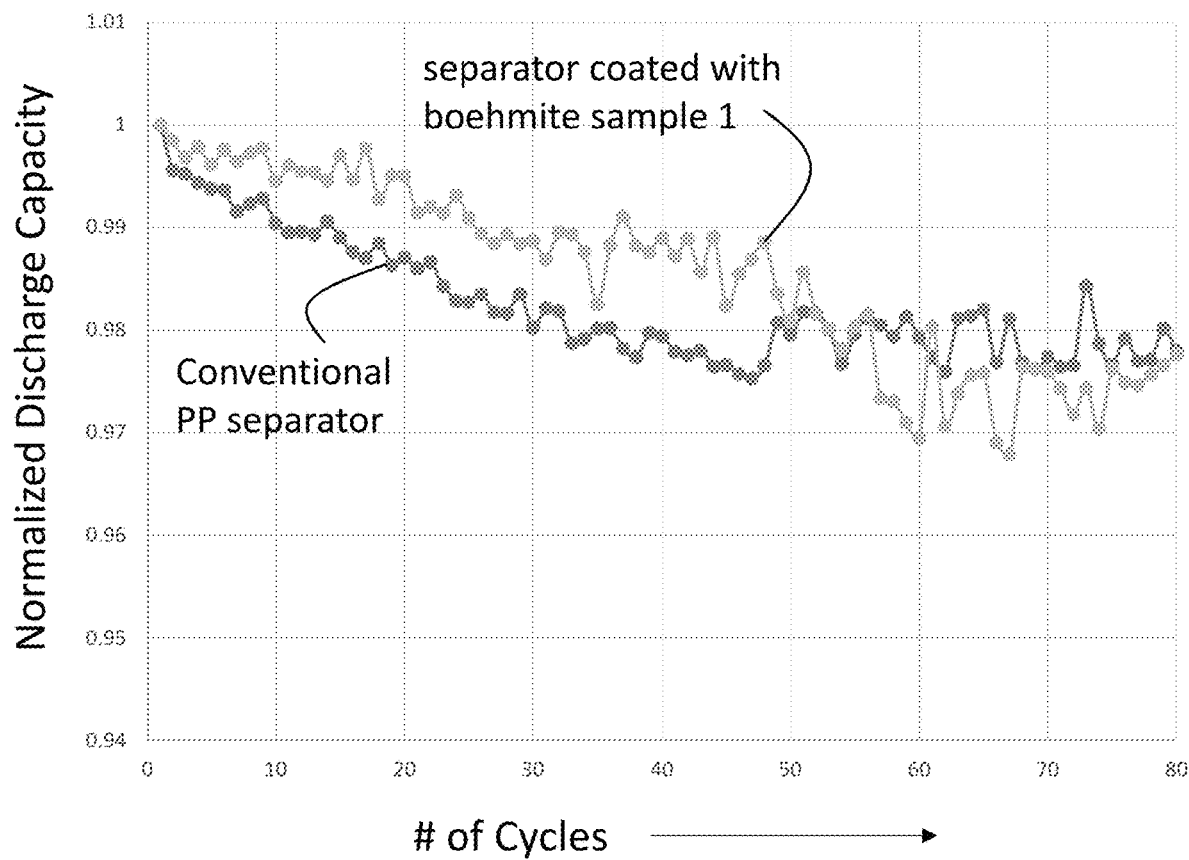
FIG. 5 is a graphical representation of the normalized discharge capacity measured as a function of cycles for a cell having a conventional separator and cells having a coated separator prepared accoding to the present disclosure.
Figure 6:
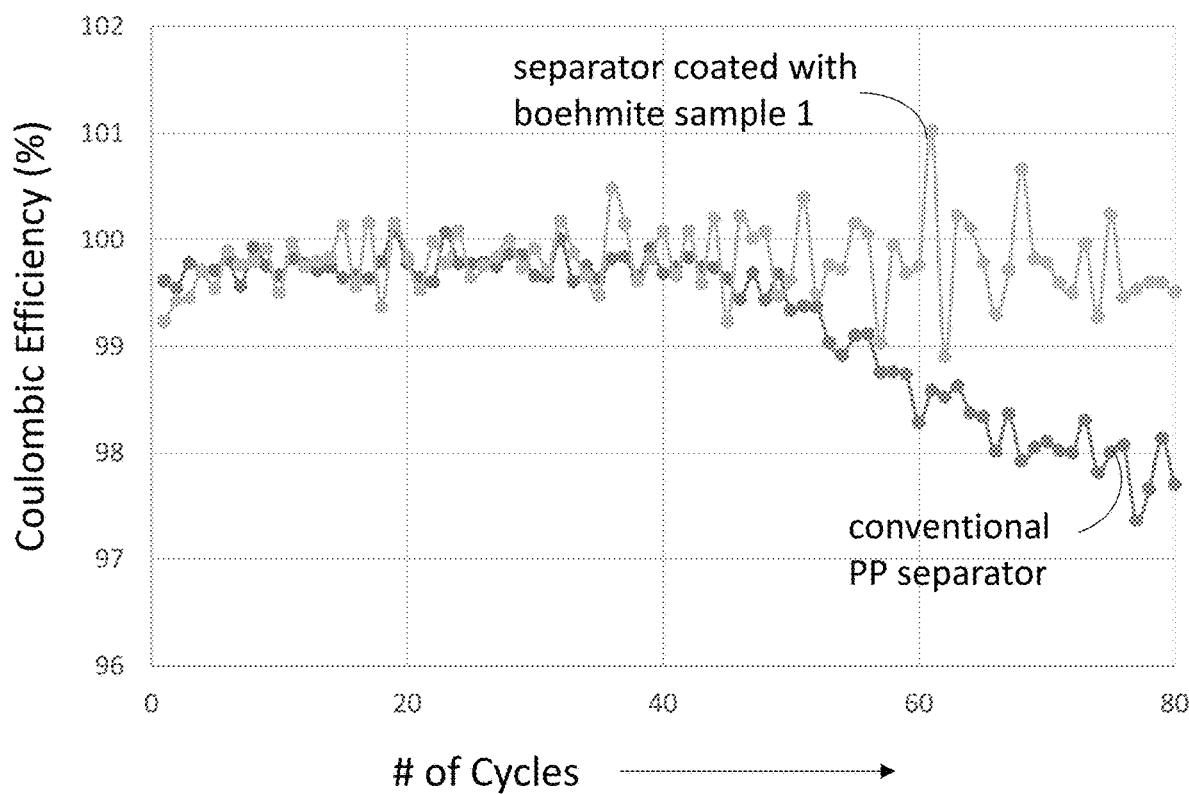
FIG. 6 is a graphical representation of the coulombic efficiency measured as a function of cycles for a cell having a conventional separator and cells having a coated separator prepared according to the present disclosure.

In the first formation cycle, the cell with the conventional polypropylene separator shows a discharge capacity of 151.1 mAh/g with 86.1% as coulombic efficiency. In contrast, the cell with the separator coated with boehmite (sample 1) performs 153.8 mAh/g and 86.6% for the discharge capacity and coulombic efficiency, respectively. Coulombic efficiency of each cell reaches above 99% after formation cycles. After 80 cycles of C/2 charge-and-discharge, both cells with uncoated and boehmite coated separator show >2% capacity loss. However, the coated separator retains 99.5% of coulombic efficiency, while the coulombic efficiency for the cell with the uncoated conventional separator is 97.5%. A graphical comparison of the degradation of capacity and coulombic efficiency for the conventional uncoated separator and the separator coated with boehmite (sample 1) is provided in FIGS. 5 and 6. Thus, this example demonstrates that boehmite (sample 1) as the separator coating increases thermal resistance of the separator and reversibility of the electrochemical cell.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A separator for use in an electrochemical cell that includes a cathode; an anode; and a non-aqueous electrolyte, the separator comprising:
    a polymeric membrane placed between the cathode and anode, such that the separator separates the anode and a portion of the electrolyte from the cathode and the remaining portion of the electrolyte; wherein the polymeric membrane is permeable to the reversible flow of ions there through; and
    an inorganic material applied to the polymeric membrane; the inorganic material being a type of boehmite particles having an average particle size ($D_{50}$) that is less than 1,000 nanometers, a surface that is in the range of 10 m$^2$/g to 1.000 m$^2$/g, and a pore volume in the range of 0.1 cc/g to 2.0 cc/g.

2. The separator according to claim 1, wherein the inorganic material as applied to the polymeric membrane is either dispersed within at least a portion of the separator or is in the form of a coating applied onto at least a portion of a surface of the separator.

3. The separator according to claim 1, wherein the inorganic material comprises particles having a particle size ($D_{50}$) that is in the range of about 10 nanometers (nm) to about 500 nanometers (nm).

4. The separator according to claim 1, wherein the inorganic material comprises particles having
    a morphology that is cubic, spherical, or a combination thereof.

5. The separator according to claim 1, wherein the inorganic material is dispersible in aqueous-based solutions having a pH that ranges from about 3.0 to about 11.0.

6. The separator according to claim 2, wherein the coating further comprises an organic binder, such that the inorganic material accounts for about 10 wt. % to 99 wt. % of the overall weight of the coating;
    wherein the organic binder comprises polyvinyl alcohol (PVA), polyethylene oxide (PEO), polyvinylpyrrolidone (PVP), polypropylene oxide (PPO), polyacrylic acid (PAA), carboxymethyl cellulose (CMC), sodium ammonium alginate (SAA), or a mixture thereof.

7. The separator according to claim 1, wherein the polymeric membrane comprises a polyolefin, polypropylene; poly(methyl methacrylate)-grafted, siloxane grafted polyethylene; polyvinylidene fluoride (PVDF) nanofiber webs; or blends thereof.

8. An electrochemical cell comprising:
    a cathode as part of a positive electrode;
    an anode as part of a negative electrode,
    a non-aqueous electrolyte that supports the reversible flow of ions between the positive electrode and the negative electrode; and
    a separator according to claim 1.

9. The cell according to claim 8, wherein the positive electrode comprises a lithium transition metal oxide or a lithium transition metal phosphate;
    the negative electrode comprises graphite, a lithium titanium oxide, silicon metal, or lithium metal; and
    the non-aqueous electrolyte is a solution of a lithium salt dispersed in an organic solution.

10. A lithium-ion secondary battery comprising:
    one or more cells according to claim 8; and
    a housing having an internal wall that encapsulates the one or more cells.

11. The battery according to claim 10, wherein the battery further comprises at least one cell in which an inorganic additive that absorbs one or more of moisture and/or hydrogen fluoride (HF) that become present in the cell is dispersed within at least a portion of the positive electrode, the negative electrode, or the electrolyte, or is in the form of a coating applied onto at least a portion of a surface of the negative electrode, the positive electrode, or the housing.

12. A cell for use in a lithium-ion secondary battery, the cell comprising:
    a positive electrode, the positive electrode comprising an active material as a cathode for the cell and a current collector that is in contact with the cathode; wherein lithium ions flow from the cathode to the anode when the cell is charging;
    a negative electrode, the negative electrode comprising an active material as an anode for the cell and a current collector that is in contact with the anode; wherein lithium ions flow from the anode to the cathode when the cell is discharging;
    a non-aqueous electrolyte positioned between and in contact with both the negative electrode and the positive electrode; wherein the non-aqueous electrolyte supports the reversible flow of lithium ions between the positive electrode and the negative electrode; and a separator placed between the positive electrode and negative electrode, such that the separator separates the anode and a portion of the electrolyte from the cathode and the remaining portion of the electrolyte; wherein the separator is permeable to the reversible flow of lithium ions there through;

wherein at least one of the cathode, the anode, the electrolyte, and the separator includes an inorganic additive that absorbs one or more of moisture and/or hydrogen fluoride (HF) that become present in the cell; the inorganic additive being a type of boehmite particles having an average particle size ($D_{50}$) that is less than 1,000 nanometers, a surface area that is in the range of 10 $m^2$/g to 1.000 $m^2$/g, and a pore volume in the range of 0.1-2.0 cc/g.

13. The cell according to claim 12, wherein the inorganic additive comprises particles having a particle size ($D_{50}$) that is in the range of about 10 nanometers (nm) to about 500 nanometers (nm).

14. The cell according to claim 12, wherein the inorganic additive is dispersed within at least a portion of one or more of the positive electrode, the negative electrode, the electrolyte, and the separator or
is in the form of a coating applied onto a portion of a surface of the negative electrode, the positive electrode, or the separator.

15. The cell according to claim 12, wherein the inorganic additive comprises particles having
a morphology that is cubic, spherical, or a combination thereof.

16. The cell according to claim 12, wherein the inorganic additive includes a sodium (Na) concentration of 0.1 wt. % to about 1 wt. % based on the overall weight of the inorganic additive.

17. The cell according to claim 12, wherein the inorganic additive includes one or more doping elements selecting from Li, K, Mg, Cu, Ni, Zn, Fe, Ce, Sm, Y, Cr, Eu, Er, Ga, Zr, Si, and Ti.

18. The cell according to claim 12, wherein the positive electrode comprises a lithium transition metal oxide or a lithium transition metal phosphate;
the negative electrode comprises graphite, a lithium titanium oxide, silicon metal, or lithium metal;
the separator is a polymeric membrane; and
the non-aqueous electrolyte is a solution of a lithium salt dispersed in an organic solvent.

19. A lithium-ion secondary battery comprising:
one or more secondary cells according to claim 12; and
one or more housings, such that an internal wall from one of the one or more housings encapsulates at least one or more of the secondary cells.

* * * * *